(12) United States Patent
Parasrampuria et al.

(10) Patent No.: US 11,636,290 B2
(45) Date of Patent: Apr. 25, 2023

(54) SYSTEMS AND METHODS FOR DETERMINING FEATURES OF ENTITIES BASED ON CENTRALITY METRICS OF THE ENTITIES IN A KNOWLEDGE GRAPH

(71) Applicant: REFINITIV US ORGANIZATION LLC, New York, NY (US)

(72) Inventors: Sanjna Balkrishna Parasrampuria, Singapore (SG); Benjamin Chu Min Xian, Singapore (SG); Thibaut Patrick Marc Michel Tiberghien, Skudai (MY)

(73) Assignee: REFINITIV US ORGANIZATION LLC, New York, NY (US)

( * ) Notice: Subject to any disclaimer, the term of this patent is extended or adjusted under 35 U.S.C. 154(b) by 584 days.

(21) Appl. No.: 16/685,594

(22) Filed: Nov. 15, 2019

(65) Prior Publication Data
US 2020/0160121 A1     May 21, 2020

Related U.S. Application Data

(60) Provisional application No. 62/768,489, filed on Nov. 16, 2018.

(51) Int. Cl.
*G06K 9/62*      (2022.01)
*G06V 10/75*     (2022.01)
*G06N 5/022*     (2023.01)

(52) U.S. Cl.
CPC ......... *G06K 9/6276* (2013.01); *G06K 9/6224* (2013.01); *G06K 9/6227* (2013.01); *G06N 5/022* (2013.01); *G06V 10/758* (2022.01)

(58) Field of Classification Search
None
See application file for complete search history.

(56) References Cited

U.S. PATENT DOCUMENTS 10,872,692 B2 * 12/2020 Yamamoto .......... G06F 16/9024
2017/0330357 A1 * 11/2017 Siegel ................. G06F 16/248
2018/0197128 A1 *  7/2018 Carstens ............. G06F 40/205

OTHER PUBLICATIONS

International Search Report and Written Opinion dated Feb. 12, 2020, PCT Patent Application No. PCT/IB2019/059841, filed Nov. 15, 2019, European Patent Office, 11 pages.

(Continued)

*Primary Examiner* — Tahmina N Ansari
(74) *Attorney, Agent, or Firm* — Pillsbury Winthrop Shaw Pittman, LLP

(57) ABSTRACT

Systems and methods of improved network analytics are disclosed. A system may determine feature propagation in a network of nodes of a graph database. The system may compute, at scale, datasets having complex relationships using graph analysis to determine network effects of entities in a network of entities stored in a graph database. The system may identify entities of interest, which may be associated with a quantitative feature value. The system may compute paths from an entity to the entities of interest, centrality metrics for entities in each of the paths, and path lengths to determine network effects of the entity of interests on the entity. The system may use the computed network effects, taking into account types of relationships between entities in the paths, to determine scaled quantitative feature values for the entity that is subject to the network effects of the entities of interest.

20 Claims, 12 Drawing Sheets

(56) References Cited

OTHER PUBLICATIONS

Renzo Angles, et al., "An Introduction to Graph Data Management", Dec. 29, 2017, 44 pages.
Communication dated Nov. 10, 2022, issued in the corresponding European Patent Application No. 19817813.9, pp. 1-18.
Illie Tanase et al., "A Highly Efficient Runtime and Graph Library for Large Scale Graph Analytics", Proceedings of Workshop on Graph Data Management Experiences and Systems, pp. 1-6, Jun. 22, 2014.
Rumi Ghosh et al., "Rethinking Centrality: the Role of Dynamical Processes in Social Network Analysis", Aims Journals, pp. 1-18, Mar. 27, 2014.

* cited by examiner

SYSTEMS AND METHODS FOR DETERMINING FEATURES OF ENTITIES BASED ON CENTRALITY METRICS OF THE ENTITIES IN A KNOWLEDGE GRAPH

RELATED APPLICATIONS

This application claims priority to U.S. Provisional Patent Application No. 62/768,489, filed on Nov. 16, 2018, the content of which is incorporated by reference in its entirety herein.

BACKGROUND

Entities today may form complex relationships with one another, forming large networks of entities in which some or all entities exert some level of influence on other entities. However, due to the complexity and size of the network of entities, it may be difficult and time consuming to identify and analyze networks to quantify network effects of one entity on another. For example, while relational databases may be efficient at storing and indexing large quantities of data, the nature of these databases limit an ability to represent and model the complexity and number of relationships that may exist in complex networks. Furthermore, machine learning techniques may require large, labeled, datasets that may not be available to model complex networks of entities. As such, what may be needed are improved computational techniques to model and assess network effects of a complex network of entities.

SUMMARY

The disclosure relates to systems and methods that improve an ability to assess and analyze network effects of entities in a network modeled in a knowledge graph (hereinafter, "graph" for convenience). For example, a system may perform entity and network scoring to quantify a network effect of an entity of interest. The entity of interest may be associated with a feature of interest, such as being known to have committed or be associated with a risk behavior. A network effect may refer to a quantified level of influence exerted by the entity on a network of entities that have a direct and/or indirect relationship to the entity. Thus, the system may identify other entities that may be associated with the entity of interest and may exhibit or be associated with the same feature.

To determine a network effect, the system may model each entity as a node in a graph and relationships of the entity with other entities as edges between the nodes in the graph. Thus, the system may model complex relationships between various entities as a graph and apply graph analytics to determine the network effect. Depending on the complexity of the relationships, multiple paths of entities may exist between a given pair of entities. As such, the system may assess an effect of an entity of interest on another entity through an analysis of the paths.

In particular, the system may determine a centrality metric of entities in each of the paths, path lengths of the paths, and types of relationships of the entities in the paths. The centrality metric may be determined based on a closeness centrality, a degree centrality, a betweenness centrality, and/or other quantified value based on relationships of an entity to other entities in the network. To determine a centrality metric, the system may determine and apply a weight to each of the closeness centrality, the degree centrality, and the betweenness centrality. The system may also apply weights to types of relationships so that different types of relationships may be weighted differently. As such, the system may not only take into account the level of influence an entity has in a network, but also a distance and nature of relationship of the entity to another entity in the network. The system may accordingly determine network effects of entities in a network even for complex networks. Such network effects may be applied to entities that may not be known to be associated with one or more features, but may nevertheless have associations with entities that are known to be associated with the one or more features.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

Figure 1:
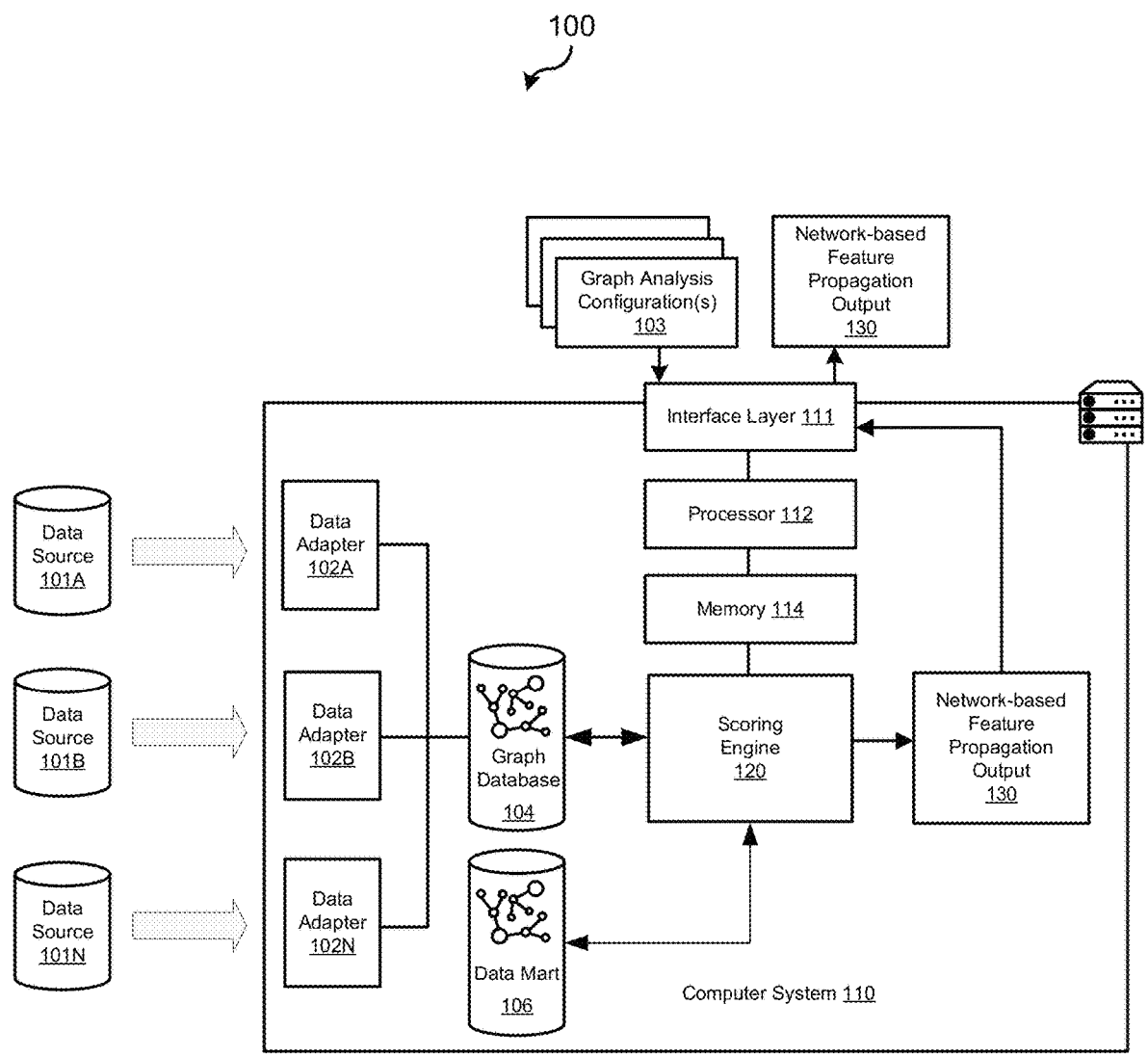
FIG. 1 illustrates a block diagram of a computer system for determining network-based feature propagation in a graph database, according to an example.

FIG. 1 illustrates a block diagram of a system 100 for determining network-based feature propagation in a graph database 104, according to an example. The system 100 may include improved network analytics systems that determine feature propagation in a network of nodes of a graph database. In particular, the system 100 may include a computer system 110 to compute, at scale, datasets having complex relationships using graph analysis to determine network effects of entities in a network of entities stored in a graph database.

For example, the system 100 may represent entities as nodes in a graph and relationships between entities as edges in the graph. The system 100 may compute centrality metrics for an entity and path lengths to neighbor entities in a graph and take into account relationships to the neighbor entities to determine network effects of the entity on the neighbor entities. Doing so may take into account complex relationships between entities to determine whether and how entities are associated with other entities.

The system 100 may be used in various ways. For example, the system 100 may analyze features of an entity that indicate that the entity is a risky entity. In this example, the feature may indicate a risk, such as criminal activity, conducted by the entity and whether and how such criminal activity or other risk is propagated to entities that are related to the entity. Other types of features of an entity may be assessed as well.

Having described a high-level overview of the disclosure, attention will now turn to a description of the system 100. System 100 may include a data source 101 (illustrated as data sources 101A-N), a computer system 110, and/or other components.

A data source 101 may be in an internal data source or a third-party data source. The data source 101 may provide information indicating features of various entities. For example, the data source 101 may include a database or service that includes law enforcement data (such as financial and non-financial crime data), sanctions lists, regulatory data, media data, watchlists, and/or other data that identify features of entities, such as crimes committed by the entities, sanctions imposed on the entities, regulatory enforcement on the entities, media related to the entities, or watchlists on which the entities have been placed. The data source 101 may therefore associate features with entities that are known to have committed the foregoing or other features or are otherwise known to be associated with such features.

In some instances, each data source 101 may be assigned with a data source weight that is applied to the information contained therein. For example, an external data source may be determined to be less reliable than an internal data source. The data source weight may be predefined and/or configurable by a user via input as a graph analysis configuration 103.

The computer system 110 may ingest the data from data sources 101A through one or more data adapters 102 (illustrated as data adapters 102A-N). In some examples, each data adapter 102 may ingest data from a respective data source 101. The ingested data may be stored in a graph database 104. The graph database 104 may store a graph (such as graph 200 illustrated in FIG. 2A) of entities and/or the one or more features of the entities based on the ingested data. The graph database 104 function as a data lake that stores triples. The graph database 104 may store and provide data storage capacities at scale larger than the data mart(s) 106. However, the data mart 106 may provide more efficient analysis of smaller sets of data. As such, the computer system 110 may use the data mart 106 to store subgraphs extracted from the graph database 104, as described herein. Doing so may leverage the capabilities of the subgraph 106 for processing efficiency while leveraging the graph database 104 for storage capabilities. The data mart 106 may include a NEO4J database, an ALLEGROGRAPH database, other types of graph databases, and/or libraries or frameworks that emulate graph databases.

The computer system 110 may be a computing device, a server, or the like. As illustrated in FIG. 1, the computer system 110 may include a processor 112, a memory 114, a data adapter 102 (illustrated as data adapters 102A-N), a graph database 104, a data mart 106, and/or other components. The processor 112 may be programmed to control operations of the computer system 110. The processor 112 may be a semiconductor-based microprocessor, a central processing unit (CPU), an application specific integrated circuit (ASIC), a field-programmable gate array (FPGA), and/or other suitable hardware device. Although the computer system 110 has been depicted as including a single processor 112, it should be understood that the computer system 110 may include multiple processors, multiple cores, or the like.

The memory 114 may have stored thereon machine-readable instructions (which may also be termed computer readable instructions) that program the processor 112 to execute various functions. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals.

In some examples, the memory 114 may store the data adapter 102, an interface layer 111, scoring engine 120, and/or other instructions. It these examples, the data adapter 102, interface layer 111 and/or scoring engine 120 may include stored instructions that program the processor 112 to perform various operations described herein (also in these examples, the data adapter 102, interface layer 111 and/or scoring engine 120 may be described as performing the various operations for convenience of illustration). It should also be noted that the data adapter 102, interface layer 111 and/or scoring engine 120 may be implemented as hardware, such as an ASIC, FPGA, and/or other suitable hardware device.

In some examples, the interface layer 111 may provide graphical user interfaces (GUIs) or other user interfaces that receive input for and/or provide output from the computer system 110. For instance, interface layer 111 may receive a graph analysis configuration 103. The graph analysis configuration 103 may include one or more user inputs for obtaining an analysis of one or more entities based on graph analysis. For example, the graph analysis configuration 103 may include an identification of one or more entities for which one or more quantitative feature values are to be provided, an identification of one or more features to be analyzed, an assignment of one or more feature weights that indicate a respective importance of a feature (to increase or decrease the contribution of a given feature to an aggregate quantitative feature value that takes into account multiple features), a centrality metric weight, a relationship weight, and/or other configurable or default values described herein. The interface layer 111 may provide a network-based feature propagation output 130 generated by the scoring engine 120. The network-based feature propagation output 130 may include quantitative feature values determined for an entity based on a network effect of one or more entities of interest on the entity (also referred to herein as a "scaled quantitative feature value"), and/or other outputs, such as the data illustrated in FIGS. 8-10.

Graph Representation of Entities, Features, and Relationships

To illustrate the data structure of the graph database 104, reference will be made to FIG. 2A, which illustrates a schematic diagram of a graph 200 of a network of entities 202 (illustrated as entities 202A-202E) for network-based feature propagation analysis, according to an example. As illustrated, the graph 200 may include various sets of relationships 201 (illustrated as sets of relationships 201A-N). Only the set of relationships 201A is shown in detail. The set of relationships 201A (a set of relationships may correspond to a subgraph of graph 200 and may also be referred to herein as a "subgraph 201") may include a network of entities 202. Each entity 202 may be represented as a plurality of nodes (depicted as circles) in the graph 200. Each entity 202 may include an individual person, a group of people, a company, an organization, and/or other identifiable subject.

In some examples, an entity 202 may be associated with one or more features 206. For example, as illustrated, entity 202B is associated with a feature 206. Other entities 202 may be associated with respective features 206 as well (not illustrated). A feature 206 may include information that describes a corresponding entity 202 and/or actions of the corresponding entity. For example, a feature 206 may include a risk behavior exhibited by entity 202B. Such risk behavior may include criminal activity known to have been conducted by the entity 202B. The criminal activity may include terrorism activity, money laundering, and/or other types of criminal activity that the computer system 110 may assess.

In some examples, the computer system 110 may assign each feature 206 with a feature weight that indicates a level of importance or severity of the feature. For example, a money laundering feature may be more severe than a tax evasion feature. As such, a feature 206 related to money laundering may be assigned with a higher feature weight than another feature 206 related to tax evasion. The feature weights may be predefined and/or configurable by a user to calibrate and customize graph analysis.

In some examples, an entity 202 may have a relationship 204 with another entity 202. The relationship 204 may be represented as an edge (depicted as a line) that connects two entities 202 in the graph 200. For example, entity 202A may have a relationship 204AB with entity 202B. Such relationships may include a person-to-person relationship (involving two entities that are people), person-to-company relationship (involving a person entity and a company entity), a company-to-company relationship (involving two entities that are companies), and/or other combinations of relationships. Only entities 202A-E and relationships 204AB-DE therebetween are labeled in FIG. 2 for illustrative clarity. Furthermore, it should be noted that the graph 200 may include other numbers of entities 202 and other numbers of relationships 204 therebetween.

In some examples, a relationship 204 may be typed. That is, there may exist different types of relationships 204 between two entities 202. Each type of relationship may be grouped together according to a relationship grouping. In some examples, the computer system 110 may assign each type of relationship 204 with a relationship weight to reflect respective levels of closeness (or importance) of the type of relationship. The weights for each type of relationship may be predefined and/or configurable by a user (such as via input of a graph analysis configuration 103) to calibrate and customize graph analysis. An example of the relationship group, type, and weight of relationships is illustrated in Table 1.

TABLE 1 lists non-limiting examples of relationship groups, types and their weights.

| Relationship Group | Relationship Type | Weight |
|---|---|---|
| Parent | hasImmediateParent, hasTopParent, hasUltimateParent | 1 |
| Owner | hasTenureInOrganization, holdsPosition | 0.9 |
| Affiliate | isAffiliatedWith | 0.8 |
| Supplier | Supplier | 0.6 |
| Consumer | Customer | 0.5 |

In some examples, a path may connect two entities 202 in the graph 200. The path may include only the two entities 202 if the two entities are immediate neighbors of one another. Two entities 202 that are connected to one another through a relationship 204 without any intermediary entities may be referred to as "immediate neighbors." For example, referring to FIG. 2A, entity 202A is an immediate neighbor to entity 202B. On the other hand, two entities 202 that are connected to one another through one or more other entities may be referred to as "non-immediate neighbors." The one or more entities between the two non-immediate entities may be referred to as intermediary neighbors. For example, an entity 202A may be a non-immediate neighbor to entity 202E. This is because the entity 202A as illustrated is connected to entity 202E through one or more intermediary entities (entities 202B and 202D).

It should be noted that there may exist multiple paths between a given pair of entities. For example, entity 202A and entity 202E may be connected via a first path that includes entities 202A, 202B, 202D, and 202E; a second path that includes entities 202A, 202C, 202D, and 202E; and a third path that includes entities 202A, 202B, 202C, 202D, and 202E. Other paths may be formed as well. A path among the multiple paths between the given pair of entities may be referred to as a "simple path" when the path does not repeat any node (or entity)—in other words, does not back-track onto any entity in the path. For example, a path between entities 202A and 202E that includes entity 202A, 202B, 202C, 202B, 202D, 202E is not a simple path because the path back-tracks (and repeats) entity 202B, whereas the path that includes entity 202A, 202B, 202D, 202E is a simple path. It should be noted that there may be multiple simple paths between two entities.

Each path may be associated with a path length. A "path length" may refer to a distance between two entities 202 in the graph 200. The path length may be based on a number of intermediary entities (including zero for immediate neighbors) and/or relationships between the two entities, so long as the path length quantifies the distance between two entities 202 in the graph 200. Having described the graph database 104 in the context of an example graph 200, attention will now turn to metrics for centrality determinations with reference to FIGS. 1 and 2B.

Centrality of an Entity as a Measure of Influence

In some examples, the scoring engine 120 may determine a centrality metric of an entity 202. The centrality metric may quantitatively indicate relationships of the entity 202 with respect to other entities 202 in the graph 200. As such, the centrality metric determined for the entity 202 may indicate a determined level of influence that the entity has on other entities. The centrality metric may be based on, for example, a closeness metric, a degree metric, a betweenness metric, and/or other metrics that describe relationships between an entity and other entities.

Figure 2A:
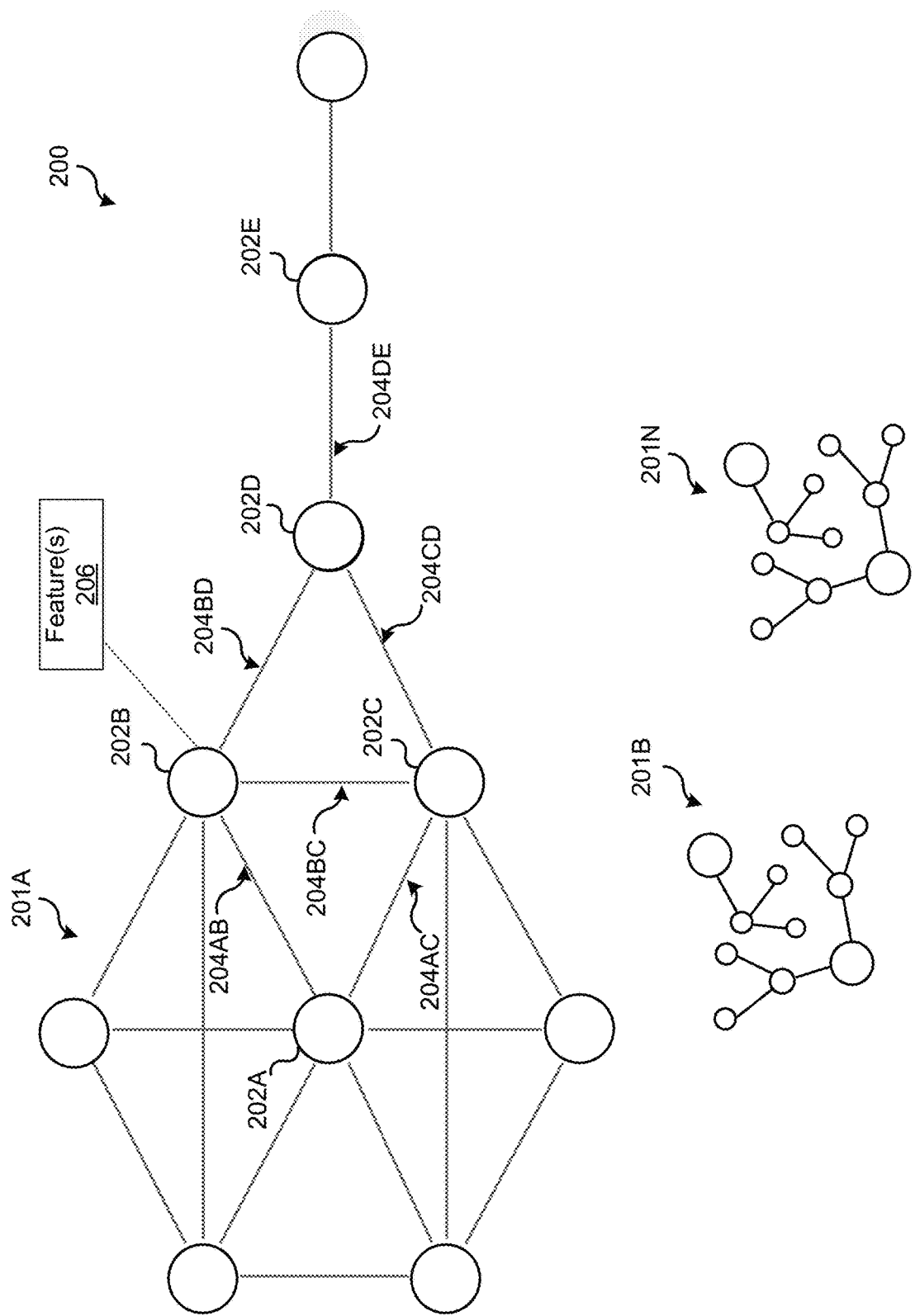
FIG. 2A illustrates a schematic diagram of a graph of a network of entities for network-based feature propagation analysis, according to an example.
Figure 2B:
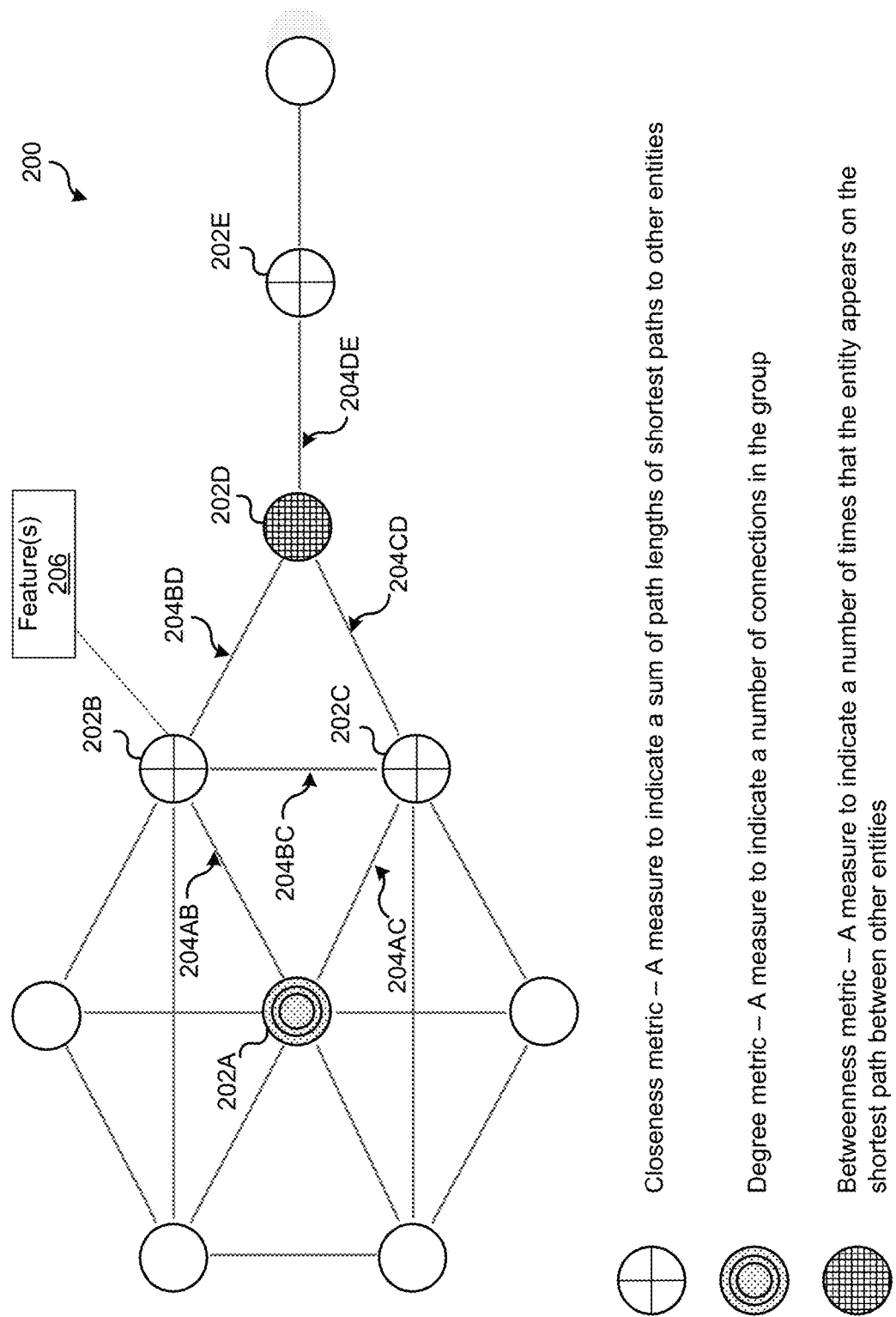
FIG. 2B illustrates a schematic diagram of determining a centrality metric, according to an example.

Referring to FIG. 2B, the closeness metric is illustrated with reference to solid circles with cross-marking (representing entities 202B, 202C, and 202E). The closeness metric of an entity may refer to a level of closeness to all other entities in the graph 200. For example, the closeness metric may reflect a sum of path lengths of shortest paths to other entities in the graph 200. A shortest path may refer to a path between two entities in which there is a smallest number of intermediary entities and/or relationships between the two entities. Thus, the closeness metric may quantify a level of closeness of the entity to other entities in the graph 200.

The degree metric is illustrated with reference to concentric circles (such as entity 202A). The degree metric of an entity may measure a number of other entities in the graph 200 to which the entity is directly connected. In other words, the degree metric may indicate a number of edges (relationships) that are incident upon the node representing the entity. For example, entity 202A may have six other entities directly connected to it. Thus, entity 202A may have the highest value degree metric compared to entity 202B (five other entities), entity 202C (five other entities), entity 202D (three other entities), and entity 202E (two other entities).

The betweenness metric is illustrated with reference to gray hashed circles, (such as entity 202D). The betweenness metric of an entity may measure a number of times that the entity appears along a shortest path between two other entities. Thus, the betweenness metric may indicate how often an entity is an intervening (or connecting) entity between two other entities.

In some examples, the scoring engine 120 may generate the centrality metric of an entity 202 by aggregating the closeness, degree, and betweenness metrics of the entity. In some of these examples, the scoring engine 120 may determine a metric weight for each of the closeness, degree, and betweenness metrics for aggregation. For example, the scoring engine 120 may conduct Principle Component Analysis ("PCA") on the closeness, degree, and betweenness metrics to determine a metric weight for each of these metrics. PCA analysis may be used to assign and calculate the corresponding weights for each of the centrality measures used. The weights may be used to normalize the weighted centrality measures into one final centrality value for each entity. For example, when the scoring engine 120 determines the metric weights, the scoring engine may apply each metric weight to a respective one of the closeness, degree, and betweenness metrics to determine a weighted closeness metric, a weighted degree metric, and a weighted betweenness metric.

Propagation Based on Centrality and Entity Relationships

In some examples, the centrality of an entity may indicate the network effects of that entity. The network effects may be used to quantitatively assess whether and/or how a feature of that entity will propagate to other entities in the graph 200. For example, depending on the network effects of entity 202B on other entities in the graph 200, the other entities may be inferred to have a risk to also exhibit the feature 206. By assessing the network effects of the entity 202B in the graph 200, the computer system 110 may generate an assessment of whether or not (and/or degree) to which other entities in the graph 200 are associated with the feature 206 such as criminal activity.

The computer system 110 may generate an association score for each entity (such as entity 202E) to which the entity 202B is an immediate or non-immediate neighbor based on graph analysis to determine the network-based effect that the entity 202B has on other entities. The association score may refer to a quantitative measure of influence that exerted on a neighbor entity based on the nature of the relationships and distance (such as given by path length) between them. For example, the association score may include an assessment of whether a neighbor entity is likely to exhibit the feature of the entity based on network effects of the entity. To illustrate, the association score determined for entity 202E (an example of a neighbor entity of the entity 202B) may provide an assessment of whether the entity 202E will exhibit feature 206 (such as launder money) based on the network effect of entity 202B on entity 202E even though the entity 202E may not otherwise be known to conduct money laundering.

In some examples, the scoring engine 120 may include or otherwise use instructions based on the following example of pseudocode to generate the association score for an entity 202. The pseudocode illustrated in Table 2 that follows will be described with reference to the scoring engine 120 and FIGS. 3A and 3B. It should be noted that the pseudocode is provided for illustration. Various operations of the pseudocode may be omitted, combined with other operations, or rearranged, and other operations may be added.

TABLE 2

Example pseudocode to generate an association score.

Block 1. Identify entities having one or more inputted
features (such as sanction or crime tags) from the graph
database by issuing a query to the graph database:
  IF an entity has any sanction or crime tags
  THEN extract the ID of this entity and insert into
identified_ entity_list to be processed later
  ELSE
    Skip
Block 2. Use identified_entity_list derived from (1):
FOR every entity in the identified_entity_list
  Issue a query to the graph database using the entity ID
  to extract its neighbors
  IF entity has neighbor
    a. Derive an adjacency list for each entity,
    which comprises how this particular entity is
    connected to its immediate and non-immediate
    neighbors (non-immediate will refer to connections
    of more than 1 hop away), relation types and
    weights.
    b. Add this adjacency list into the subgraph list
ENDFOR
Block 3. Use the subgraph list derived from (2):
FOR every subgraph in the subgraph list:
  a. Determine the presence of risk for each entity in
  a subgraph in terms of finding what are the crime types
  and relation weight
  b. Calculate the centrality metrics for each entity;
  there are 3 measures are used: degree centrality (DC),
  closeness centrality (CC), and betweenness centrality
  (BC)
INPUT: Adjacency list for a subgraph
PROCESS: Calculate DC, CC, and BC, which will be then stored
in d_dict, c_dict, d_dict
OUTPUT: List of centrality metrics for each entity stored in
list_of_centralities
c. Aggregate the centrality metrics
INPUT: list_of_centralities
PROCESS: Perform PCA to determine the weights for each of
these centrality metrics (resulting in bweight, cweight, and
dweight values to be used for each subgraph). Aggregate these
weights for the subgraph as follows:
aggregated_centrality = (bweight×BC) + (cweight×CC) + (dweight × DC)
OUTPUT: Aggregated scores for the centrality of each entity,
which will be then stored in centrality_map.

TABLE 2-continued

Example pseudocode to generate an association score.

d. Compute the influence each risky node exerts on its
neighbor entities to measure how risk propagates in the
network
INPUT:
1. Pre-defined relation weights defined in a file
2. Aggregated centrality metrics from centrality_map
OUTPUT: propagated_risk
PURPOSE: This ensures that the root node has a weaker impact
on the nodes that are further away from it, but also accounts
for the strength of the relationships (the "additional
effect"). For example, the relationship between two directors
1 hop away from each other should be stronger than the
relationship between two employees 1 hop away from each other.
e. Calculate the association score
INPUT: propagated_risk
OUTPUT: Scaled association scores for each crime type (stored
in scaled_final_risk_score).
ENDFOR Referring to the pseudocode illustrated at Table 2, based on block 1, the scoring engine 120 may take as input an identification of one or more features 206 for analysis and output a list of entities 202 that are associated with the one or more features 206. The one or more features 206 may be inputted by a user as a graph analysis configuration 103 so that the user may obtain an assessment of entities 202 with respect to the one or more features 206. The scoring engine 120 may query the graph database 104 to identify entities 202 in the graph 200 that are associated with the one or more features 206. For example, the scoring engine 120 may query the graph database 104 to identify entities 202 associated with are features 206 such as a sanction tag or crime tag, which may respectively indicate that an entity has been sanctioned or convicted of a crime. The scoring engine 120 may query other types and numbers of features 206 as well.

Based on block 2, the scoring engine 120 may take as input the list of entities 202 identified at block 1 and output subgraphs, such as a subgraph 201 illustrated in FIG. 2A. A "subgraph" may refer to a portion of a larger graph, such as graph 200, that includes an entity 202 and its neighbor entities (immediate and/or non-immediate neighbors). Each subgraph may correspond to a respective one of the identified entities 202 and corresponding adjacency lists of the entities. The scoring engine 120 may extract, for each identified entity 202, a subgraph from the graph database 104. In some examples, each subgraph may be stored in a data mart 106 for further interrogation and analysis. Each identified entity 202 may be associated with an adjacency list. An "adjacency list" may refer to a listing of neighbor entities (whether immediate or non-immediate) of the identified entity 202, the connections among the neighbor entities to one another and to the identified entity, and corresponding types of relationships among the neighbor entities and to the identified entity.

Based on block 3, the scoring engine 120 may take as input the subgraph list and adjacency lists from block 2 and output the association score. For example, based on block 3b, the scoring engine 120 may, for each subgraph in the subgraph list, determine a centrality metric for each entity in an adjacency list for the subgraph. Such centrality metric may be based on the closeness metric, degree metric, and betweenness metric (and corresponding weights) described with respect to FIG. 2B. The scoring engine 120 may generate a list of centralities that includes the closeness metric, degree metric, and betweenness metric for each entity in the subgraph. Based on block 3c, the scoring engine 120 may determine a weight for each of the closeness metric, degree metric, and betweenness metric for each entity to generate an aggregated centrality for each entity. Such aggregated (or weighted) centrality metric may be stored in a centrality map. Based on block 3d, the scoring engine 120 may determine the influence of an entity that is associated with one or more features 206 on neighbor entities. For example, the scoring engine 120 may access predefined and/or configurable relationship weights and the weighted centrality metric from the centrality map to generate a respective association score for each of the one or more features 206. For example, an association score may be generated that assesses a level of association to risk of a neighbor entity will be (or has been) sanctioned or will (or has) committed a crime such as a financial crime. Thus, the scoring engine 120 may determine an association score for each entity that neighbors an entity that is associated with an inputted feature 206.

For a given entity in a network, the association score (A) may be determined based on equation 1, which is also described with reference to FIGS. 3A-C that follows:

$$(A) = \tanh\left(\sum_i \left(\log\left(1 + \sum_j \left(1 - \tanh\left(\frac{\text{path\_length}_j + 1 - \frac{\sum_k \text{centrality}_k}{\text{path\_length}_j}}{10}\right)\right)\right)\right)\right), \quad (1)$$

wherein:
  i=reachable entities that have the feature of interest,
  j=simple paths to a reachable entity, and
  k=entities along path j.

The association score may provide a quantitative evaluation of a "network effect" of one or more entities on a given neighbor. Put another way, the association score of a neighbor, which itself may be an entity in the graph, may quantify the network effect of one or more entities that exhibit a feature of interest (a "reachable entity" as illustrated in Equation 1).

Each relationship type has its weight defined, the weight will be used to determine the proximity between the source and target entities, for example degree of separation between these entities can be of a certain number, separated by (N) hops away where each of the hop is indicated by a relationship type, and this is weighted. A total sum of all weighted paths between source and target may be calculated, where entities closer to the entity having a feature of interest (such as a risky entity) using a more "important" relationship (indicated by the weight) will have higher association score than other entities (that are located further away) with less "important" relationship types.

A high quantitative feature value may be assigned when an entity is in close proximity to a single or multiple known risky entities and when the entity also has high influence within the network. It can be said to have high influence either because it is a hyper-connected entity, where (1) it has many connections to other entities in the network, (2) it is the closest access point to reach other entities, and/or (3) acts as a bridge/link between entities or sub-networks.

Figure 3A:
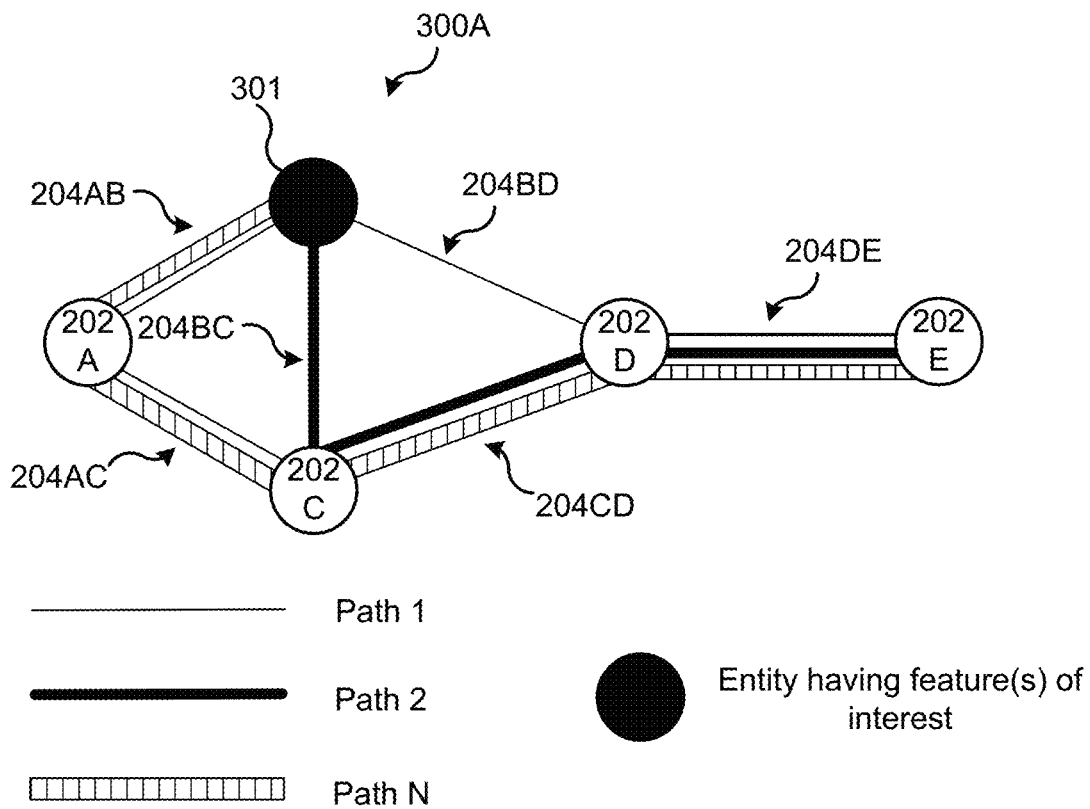
FIG. 3A illustrates a schematic diagram of a mapping showing paths from an entity of interest to a non-immediate neighbor, according to an example.

FIG. 3A illustrates a schematic diagram of a mapping 300A showing paths (1-N) from an entity of interest 301 to a non-immediate neighbor 202E, according to an example. As illustrated, an entity of interest 301 (shown as a black node, hereinafter "entity 301") is connected to the entity 202E, which is a non-immediate neighbor of the entity of interest 301. The entity 301 may be associated with one or more features 206 indicated to be of interest. For example, the entity 301 may have committed fraud and a user may wish to understand the network effect of the entity 301 on other entities. In particular, the user may wish to understand the network effect of entities that commit fraud (such as entity 301) on an entity (such as entity 202E) being investigated by the user for various purposes such as KYC.

The entity 301 may correspond to a "reachable entity" described in Equation 1. There may exist various paths (1-N) between the entity 301 and the entity 202E. Each path (1-N) may correspond to a $path_j$ in Equation 1. Each path (1-N) may include one or more entities from the entity 301 to the entity 202E. The entities in a path (1-N) may correspond to $entities_k$ in Equation 1. For example, the path 1 from entity 301 to entity 202E may include entity 301, entity 202C, and entity 202D. In some examples, each path (1-N) may include the ending entity. For example, the path 1 may also include entity 202E.

Each pair of entities on a path (1-N) may have a relationship 204 therebetween. Examples of relationships and corresponding relationship weights are illustrated in Table 1. Each path (1-N) may correspond to a $path_j$ to a reachable entity illustrated in Equation 1. A centrality metric may be determined for each entity in a path (1-N). Each centrality metric for each entity in the path may correspond to $centrality_k$ in Equation 1.

Figure 3B:
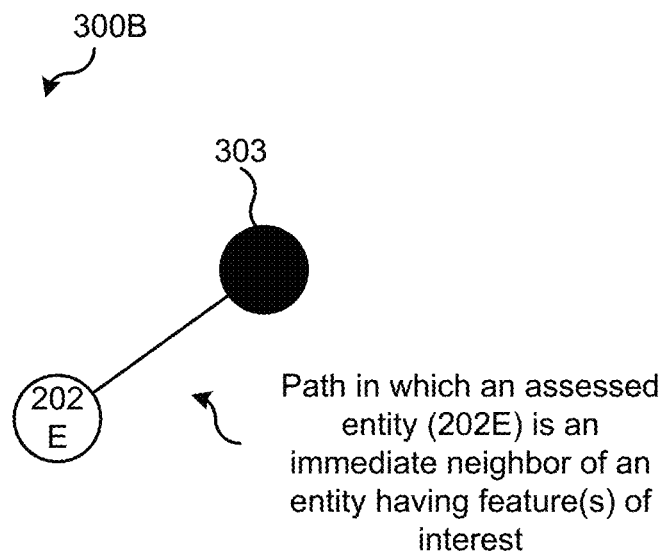
FIG. 3B illustrates a schematic diagram of a mapping showing a path from another entity of interest to an immediate neighbor, according to an example.

FIG. 3B illustrates a schematic diagram of a mapping 300B showing a path from another entity of interest 303 to an immediate neighbor 202E, according to an example. Like the entity 301 illustrated in FIG. 3A, the entity of interest 303 (hereinafter, entity 303) may likewise be associated with a feature 206 of interest. The entity 303 may be directly connected to the entity 202E. In other words, entity 303 and entity 202E may be immediate neighbors. In this example, the path between the entity 303 and the entity 202E may include the entity 303. In some examples, the path may further include the entity 202E. It should be noted that the path, entities, and relationship between entity 303 and entity 202E may be modeled similarly to those described with respect to FIG. 3A. For example the path between entity 303 and entity 202E may correspond to a $path_j$ in Equation 1 and entity 303 may correspond to a reachable entity in Equation 1. It should be noted that there may also exist other paths that include non-intermediary neighbors (not illustrated) between entity 303 and entity 202E. Thus, in one path, the entity 303 and the entity 202E may be immediate neighbors while in another path the entity 303 and the entity 202E may be non-immediate neighbors. All of these paths may be accounted for and analyzed in Equation 1.

Figure 3C:
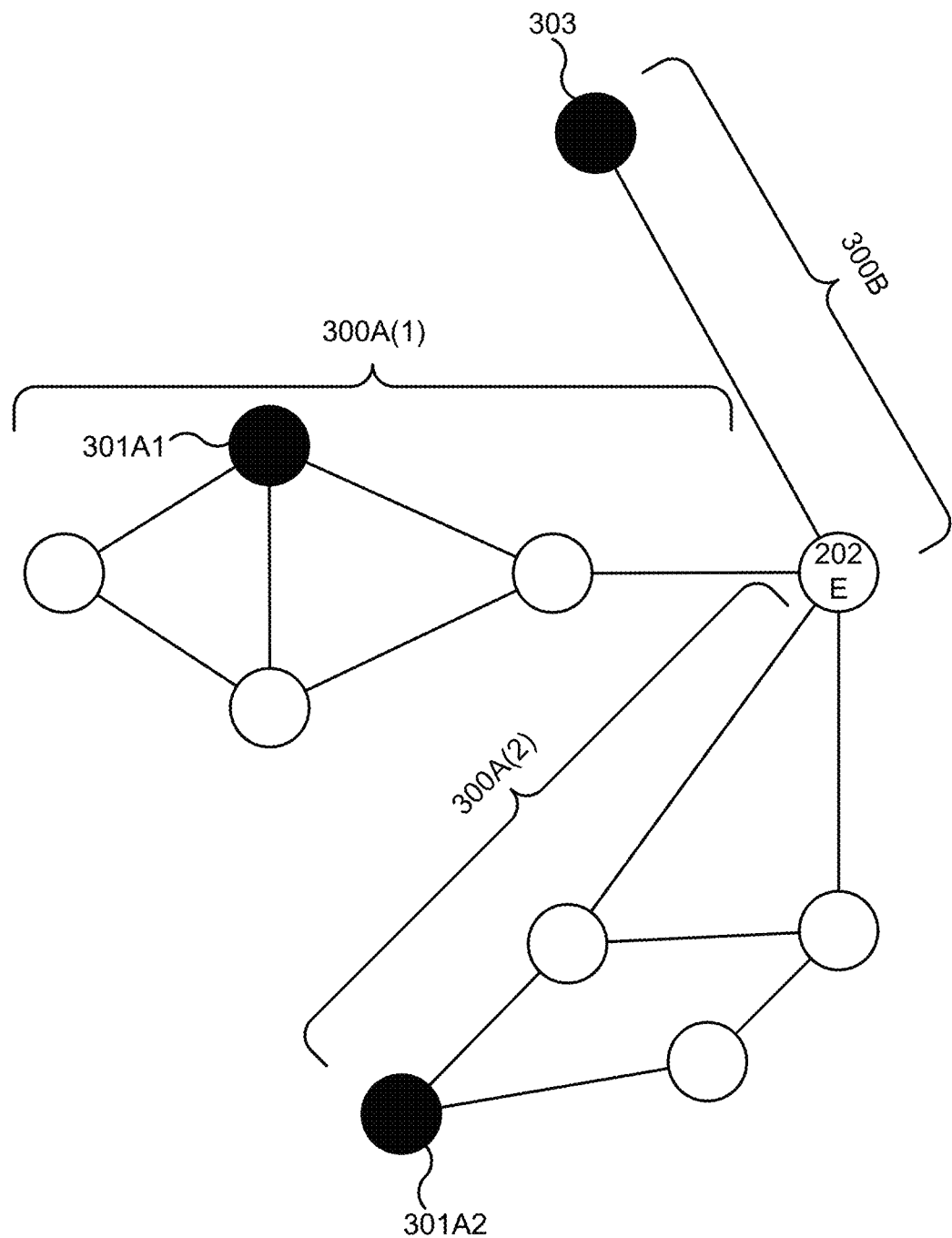
FIG. 3C illustrates a schematic diagram of the network effect of multiple reachable entities on an entity, according to an example.

FIG. 3C illustrates a schematic diagram of the network effect of multiple reachable entities 301A1, 301A2, and 303 on an entity 202E, according to an example. As illustrated a given entity 202E in a network of entities may be associated with multiple reachable entities 301A1, 301A2, and 303. Each of the reachable entities 301A1, 301A2, and 303 may be associated with a feature of interest 204. Each of the entities 301A1, 301A2, and 303 may have a mapping (respectively 300A(1), 300A(2), and 300B) to the entity 202E. The scoring engine 120 may account for each of these mappings, and the corresponding paths, entities in the paths, centralities of the entities in the paths, and relationships of the entities in the paths to determine a network effect of the reachable entities 301A1, 301A2, and 303 on the entity 202E. As such, the scoring engine 120 may generate a quantitative feature value for the entity 202E based on the network effect that the reachable entities 301A1, 301A2, and 303 cumulatively have on the entity 202E.

Figure 4:
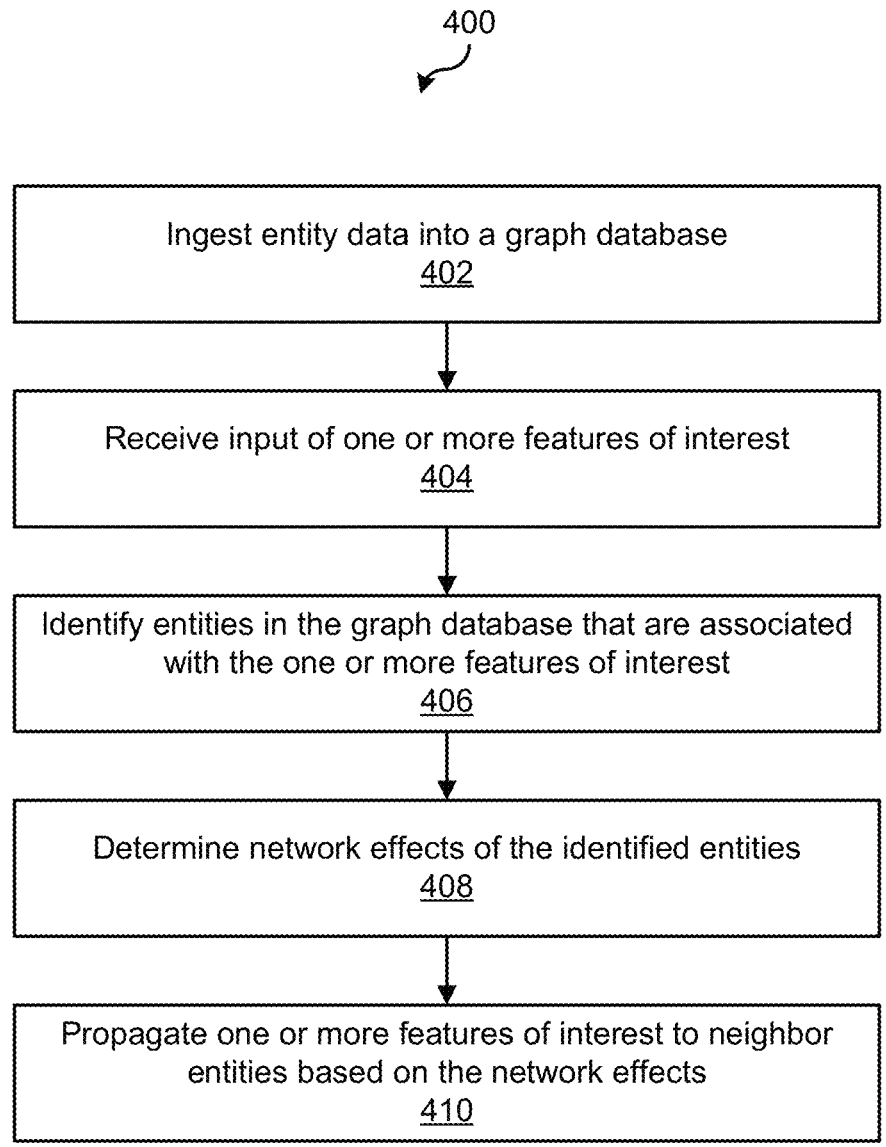
FIG. 4 illustrates a flow diagram of an example method for determining network-based feature propagation in a graph database, according to an example.

FIG. 4 illustrates a flow diagram of an example method 400 for determining network-based feature propagation in a graph database, according to an example. At 402, the method 400 may include ingesting entity data into a graph database, such as graph database 104 illustrated in FIG. 1. At 404, the method 400 may include receiving input of one or more features of interest, such as a feature 206 illustrated in FIG. 2. At 406, the method 400 may include identifying entities in the graph database that are associated with the one or more features of interest. At 408, the method 400 may include determining a network effect of the identified entities. At 410, the method 400 may include propagating one or more features of interest to neighbor entities based on the determined network effect.

Figure 5:
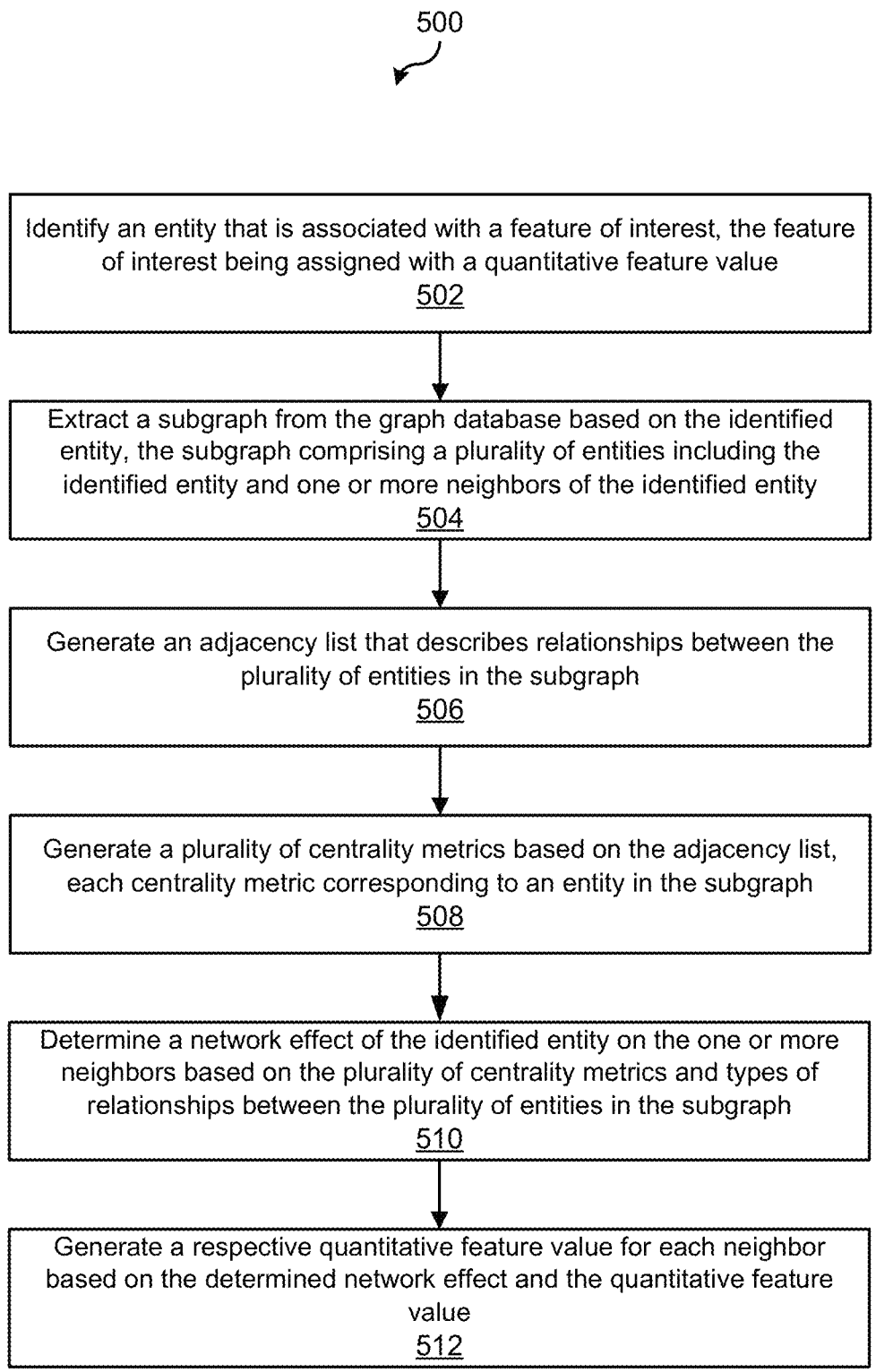
FIG. 5 illustrates a flow diagram of an example method for determining network-based feature propagation in a graph database, according to an example.

FIG. 5 illustrates a flow diagram of an example method 500 for determining network-based feature propagation in a graph database, according to an example. At 502, the method 500 may include identifying an entity that is associated with a feature of interest, the feature of interest being assigned with a quantitative feature value.

At 504, the method 500 may include extracting a subgraph from the graph database based on the identified entity, the subgraph comprising a plurality of entities including the identified entity and one or more neighbors of the identified entity. At 506, the method 500 may include generating an adjacency list that describes relationships between the plurality of entities in the subgraph.

At 508, the method 500 may include generating a plurality of centrality metrics based on the adjacency list, each centrality metric corresponding to an entity in the subgraph. To generate a given centrality metric for an entity, the method 500 may include determining a degree centrality based on a number of neighbors to which the entity is connected, determining a closeness centrality based on a number of shortest paths to other entities in the subgraph, and determining a betweenness centrality based on a number of times that the entity appears in a shortest path between other entities, wherein the given centrality metric is based on the degree centrality, the closeness centrality, and the betweenness centrality. In some of these examples, the method 500 may further include applying a degree weight to the degree centrality to generate a weighted degree centrality, applying a closeness weight to the closeness centrality to generate a weighted closeness centrality, and applying a betweenness weight to the betweenness centrality to generate a weighted betweenness centrality.

The method 500 may further aggregate (such as sum) the weighted degree centrality, the weighted closeness centrality, and the weighted betweenness centrality to generate the given centrality metric to generate the given centrality metric. Thus, the centrality metric may, in these examples, be an aggregate of weighted degree centrality, weighted closeness centrality and weighted betweenness centrality of the entity.

At 510, the method 500 may include determining a network effect of the identified entity on the one or more neighbors based on the plurality of centrality metrics and types of relationships between the plurality of entities in the subgraph. In some examples, the method 500 may include accessing the types of relationships from a predefined relationship data. Such predefined relationship data may further include relationship weights that quantify an importance or closeness of a given relationship, which may be indicative of a network effect that one entity may have on another entity. Examples of types of relationships and respective relationship weights were described with respect to Table 1.

In some examples, to determine the network effect of the identified entity, the method 500 may further include, for each neighbor among the one or more neighbors: determining a first path (such as a "path 1" illustrated in FIG. 3A) that connects the identified entity to the neighbor in the subgraph, the first path comprising one or more entities in the subgraph and determining a feature propagation from the identified entity to the neighbor based on a centrality metric of each of the one or more entities in the first path, types of relationships between the one or more entities in the first path, and a first path length of the first path.

In some examples, the network effect may be based on more than one path from the entity to a given neighbor. For example, the method 500 may include determining a second path (such as a "Path 2" illustrated in FIG. 3A) that connects the identified entity to the neighbor in the subgraph, the second path comprising one or more second entities in the subgraph, the one or more second entities different than the one or more entities in the subgraph and determining the feature propagation from the identified entity to the neighbor based further on a second centrality metric of each of the one or more second entities in the second path, types of relationships between the one or more second entities in the first path, and a second path length of the second path.

Figure 8:
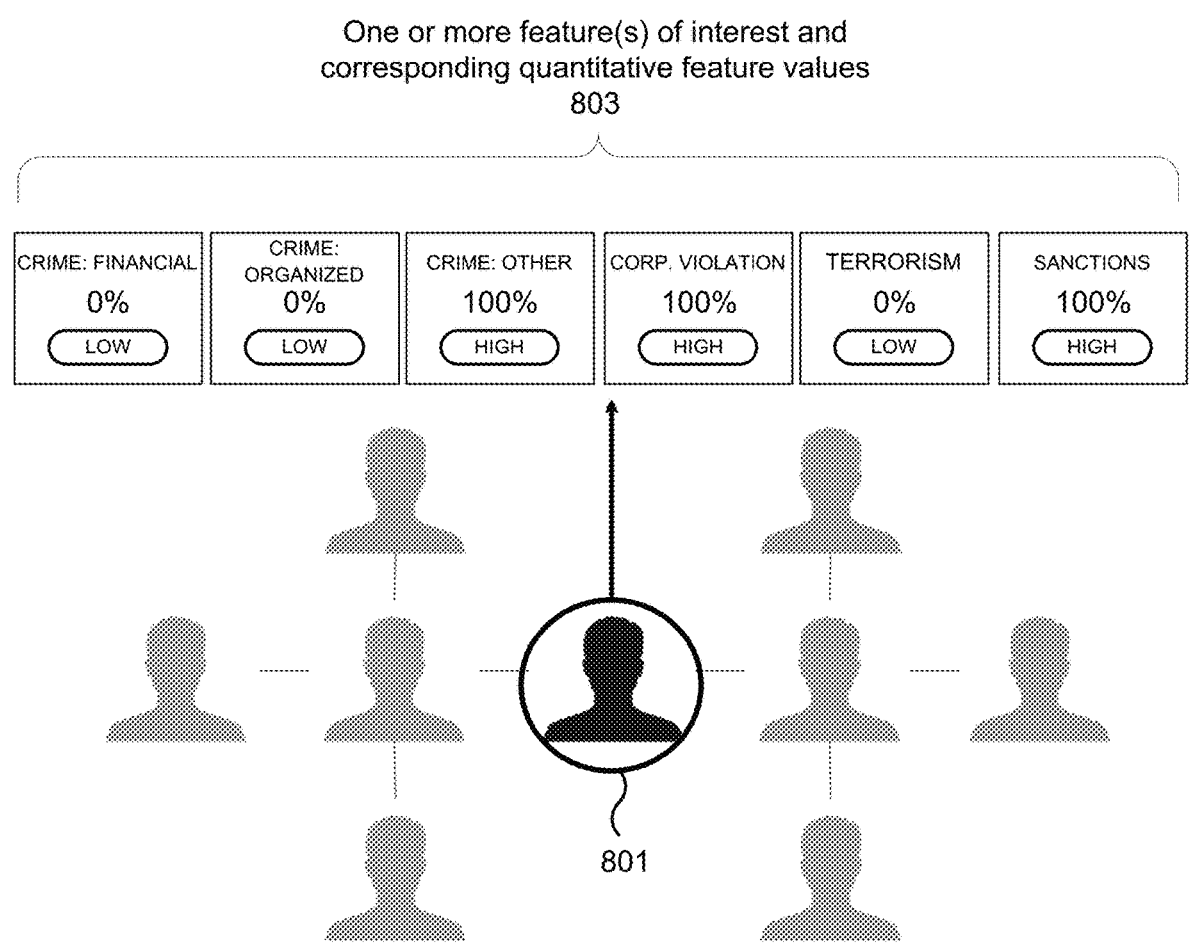
FIG. 8 illustrates a schematic diagram of features of interest and corresponding quantitative feature values of an entity, according to an example.
Figure 9:
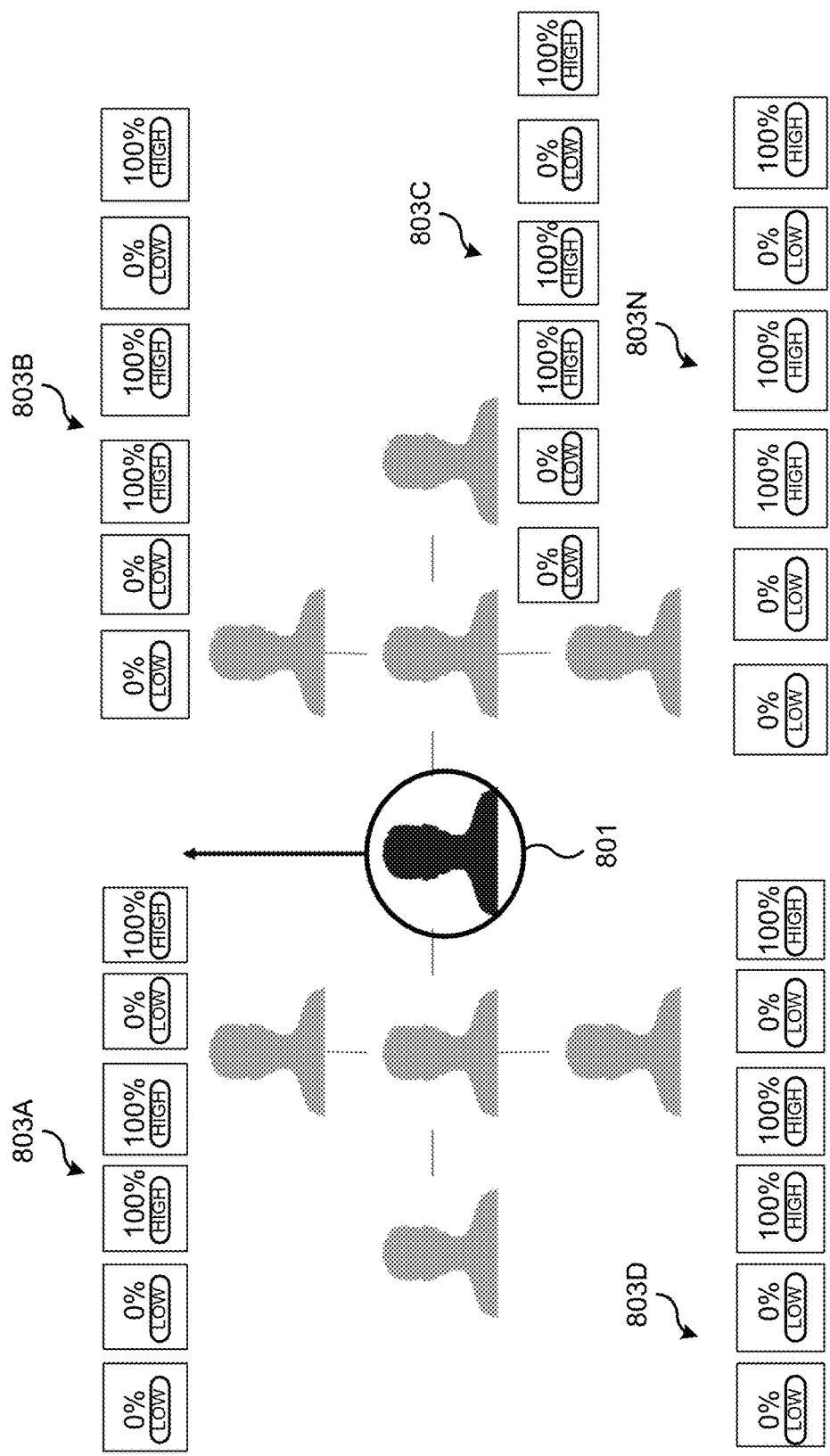
FIG. 9 illustrates a schematic diagram of determining propagation of features of interest and corresponding quantitative feature values of an entity to neighbor entities based on graph analysis, according to an example.
Figure 10:
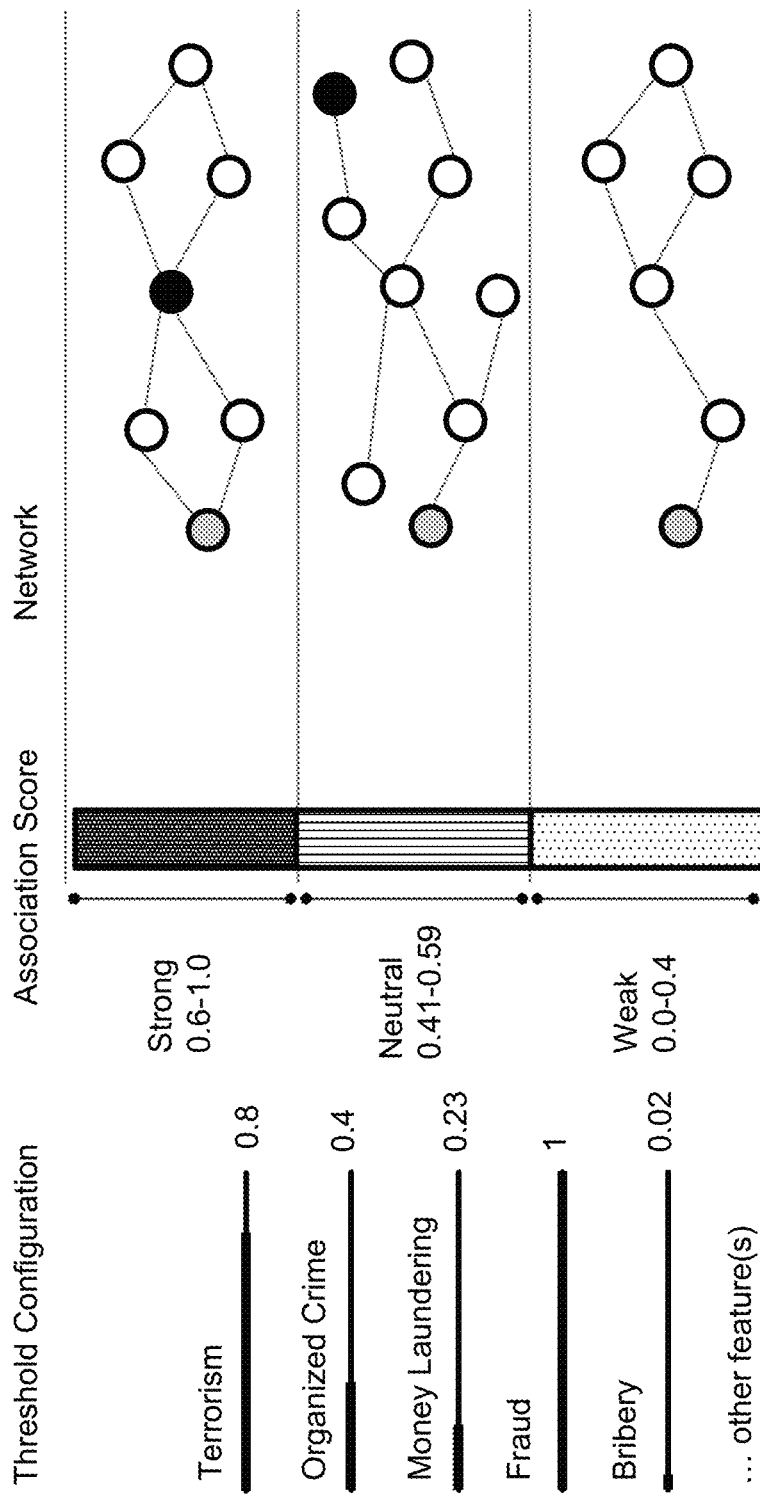
FIG. 10 illustrates a schematic diagram of examples of features, corresponding threshold configurations, and mapping quantitative feature values to qualitative values, according to an example.

At 512, the method may include generating a respective quantitative feature value for each neighbor based on the determined network effect and the quantitative feature value. In some examples, the method 500 may include generating, for each neighbor, a plurality of respective quantitative feature values for different types of features. For example, as illustrated in FIGS. 8-10, the method 500 may assess different features of interest and determine respective quantitative feature values for each neighbor entity. Referring to FIGS. 5 and 8, the method 500 may assess one or more features of interest: "Crime: Financial", "Crime: Organized", "Crime: Other", "Corporate Violation", "Terrorism," and "Sanctions" and respective quantitative feature values 0%, 0%, 100%, 100%, 0%, and 100% (803) (hereinafter feature metrics 803) for an entity 801. It should be noted that the entity 801 may be assigned with a 100% quantitative feature value as a result of the entity 801 having been known to conduct or be associated with the corresponding feature. As illustrated, entity 801 may have committed or be associated with "crime: other," "corporate violation" and "sanctions" features. Other numbers and types of features may be assessed as well, and other quantitative metric scale other than 0-100% may be used. As illustrated, each quantitative metric may be mapped to a qualitative metric such as "Low", "Medium" or "High" to qualitatively indicate a level of risk or other qualitative description of the quantitative feature value. Such mapping, as well as aggregation of quantitative feature values into an aggregate quantitative feature value will be described with reference to FIG. 10. Referring to FIGS. 5 and 9, the method 500 may apply the network effect of entity 801 on its neighbors (illustrated as grey entities) to propagate the feature metrics 803 of the entity 801 to its neighbors in a graph. For example, various neighbors may be determined to have feature metrics 803A-N based on the network effect of the entity 801 on the neighbors. It should be noted that 0% and 100% are propagated in some examples illustrated in FIG. 9, although such propagation may result in a range between 0 and 100% depending on the network effect of the entity 801 on its neighbors. In some examples, the network effect of the entity 801 may be grouped into a category group. For example, a category group may refer to a crime category group, which may be broken down into several granular crime types. Each of the crime types may have their corresponding association score calculated, but at a more broader level (by the crime category group) all these associations scores will be aggregated and normalized to produce an association score for the category.

In some of these examples, as illustrated in FIG. 10, the different types of features of interest may be aggregated for a given entity and the method 500 may determine an overall quantitative feature value for the given entity based on an aggregate of the respective quantitative feature values. For example, the method may sum, or perform other aggregation, of the respective quantitative feature values, which may each be weighted based on a feature weight. Other types and numbers of features of interest may be used as well.

In some examples, a user may be interested in assessing an entity's potential association with these or other features based on its connections to one or more entities that are associated with these features. As such, the method 500 may include accessing a request to assess a risk associated with an entity identified by an entity identifier, and providing a quantitative feature value determined for the entity (such as a neighbor of an entity that is associated with the feature(s) of interest) identified by the entity identifier.

It should be noted that an entity of interest may itself be subject to the network effect of another entity. For example, a first entity that has committed a financial crime may be influenced to commit another crime such as fraud based on the network effect of another entity that committed fraud. In this sense, the first entity may itself be a "neighbor" in that the first entity may itself be influenced by another entity.

In some examples, the method 500 may further include determining an aggregate quantitative feature value for an entity based on respective quantitative feature values. For example, as illustrated in FIG. 10, features of interest "Terrorism", "Organized crime", "Money Laundering", "Fraud", "Bribery" or other features of interest may be assessed. The method 500 may include determining a quantitative feature value for an entity based on the network effect of another entity that is known to have committed or is associated with these features. In some examples, the aggregated feature value score may be based on a sum or other aggregate of the quantitative feature values. The aggregated feature value score may be weighted according to an importance of each feature. These feature weights may be predefined using default values and/or may be configured by a user by inputting the weights as part of the graph analysis configuration 103. In some examples, each feature may be associated with a threshold configuration (respectively illustrated as 0.8, 0.4, 0.23, 1, and 0.02). These thresholds may map to a qualitative assessment "Strong", "Neutral" or "Weak." Alternatively, or additionally, other qualitative values may be used, such as "High" and "Low" as well. As illustrated, the further away a given entity (illustrated as a grey node) is to an entity of interest (illustrated as a black node), the lower the association score will likely be. Likewise, if there is no entity of interest for a given feature, then the association score of the given entity will likely be lower.

Figure 6:
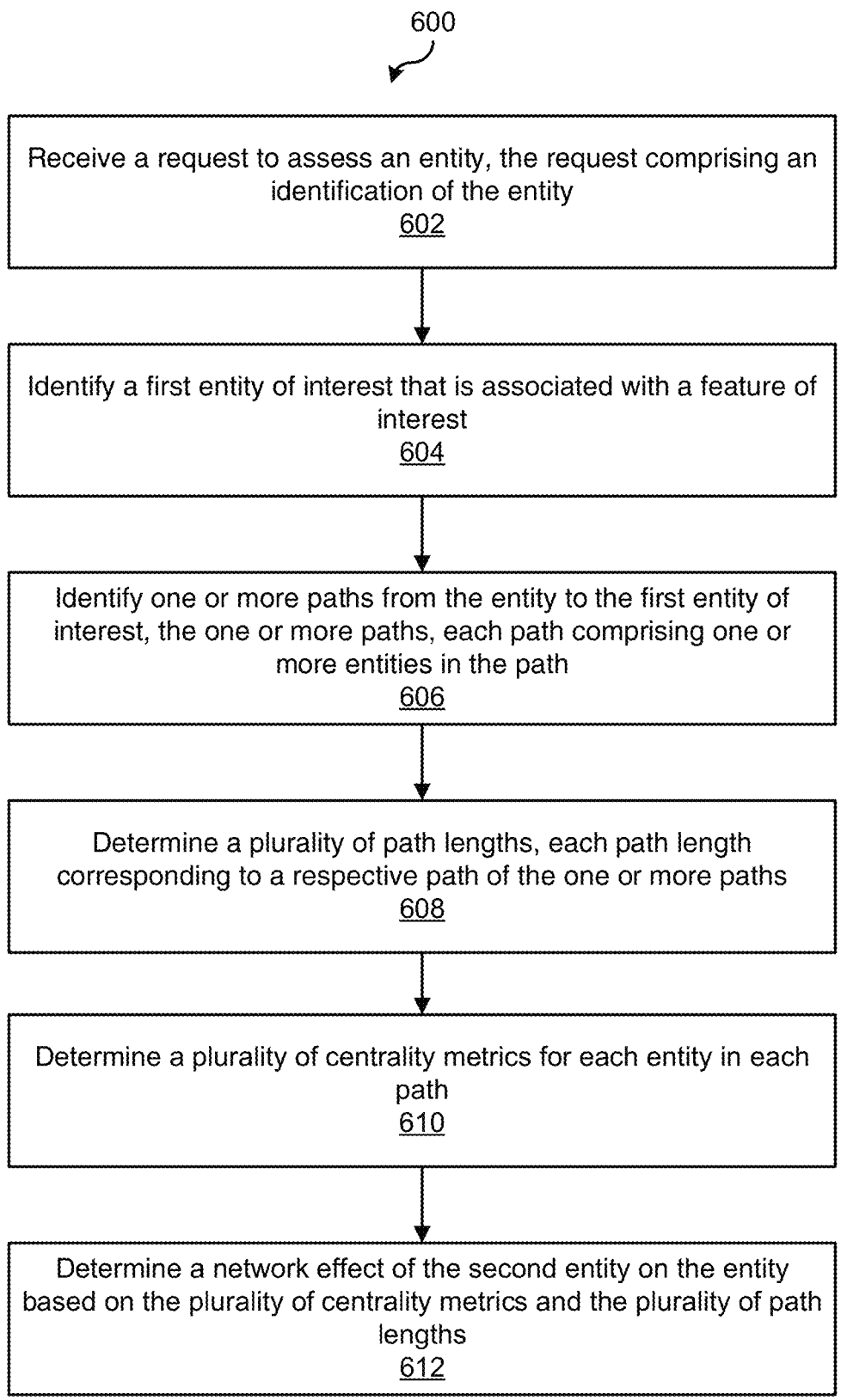
FIG. 6 illustrates a flow diagram of an example method for evaluating an entity based on network-based feature propagation, according to an example.

FIG. 6 illustrates a flow diagram of an example method 600 for evaluating an entity based on network-based feature propagation, according to an example. At 602, the method 600 may include receiving a request to assess an entity, the request comprising an identification of the entity. At 604, the method 600 may include identifying a first entity of interest that is associated with a feature of interest. At 606, the method 600 may include identifying one or more paths from the entity to the first entity of interest, the one or more paths, each path comprising one or more entities in the path. At 608, the method 600 may include determining a plurality of path lengths, each path length corresponding to a respective path of the one or more paths. At 610, the method 600 may include determining a plurality of centrality metrics for each entity in each path. At 612, the method 600 may include determining a network effect of the second entity on the entity based on the plurality of centrality metrics and the plurality of path lengths.

In some examples, the feature of interest is associated with a quantitative feature value. In these examples, the method 600 may further include determining a scaled quantitative feature value for the entity based on the network effect and the quantitative feature value. The scaled quantitative feature value may be a propagated value from the first entity of interest. For example, the network effect may be quantified as an association score. The association score may indicate a level of influence of the first entity of interest over the entity. The association score (which may be expressed as a decimal or fraction, for example) may be used to scale the quantitative feature value of the feature of the first entity of interest.

In some of these examples, the method 600 may further include identifying a second entity of interest that is associated with the feature of interest, and determining a second network effect of the second entity of interest on the entity. In these examples, the scaled quantitative feature value is determined based further on the second network effect. For example, the second network effect may be determined in a manner similar to the first network effect (that is based on paths from the entity of interest to the second entity of interest to the entity, centrality metrics of entities in the paths, and path lengths). In these examples, multiple entities of interest may have a network effect on the entity (such as illustrated in FIG. 3C). As used herein, the term "scaled quantitative feature value" is intended to mean a network effect of and entity of interest applied to a quantitative feature value. The "scaled quantitative feature value" does not necessarily refer to a quantitative feature value that has been altered since applying the network effect may reduce, increase, or not have an effect on the quantitative feature value.

It should be understood that the methods 400-600 illustrated in FIGS. 4-6 may each include additional operations and that some of the operations described therein may be removed and/or modified without departing from the scopes of the method 400-600. The description of the methods 400-600 may be made with reference to the features depicted other figures for purposes of illustration. Some or all of the operations set forth in each of the methods 400-600 may be performed by one or more of the components illustrated in FIG. 1 (or FIG. 7). As such, some or all of the operations set forth in each of the methods 400-600 may be included as circuitry, utilities, programs, or subprograms, in any desired computer accessible medium. In addition, each of the methods 400-600 may be embodied by computer programs, which may exist in a variety of forms. For example, some operations of each of the methods 400-600 may exist as machine-readable instructions, including source code, object code, executable code or other formats.

Figure 7:
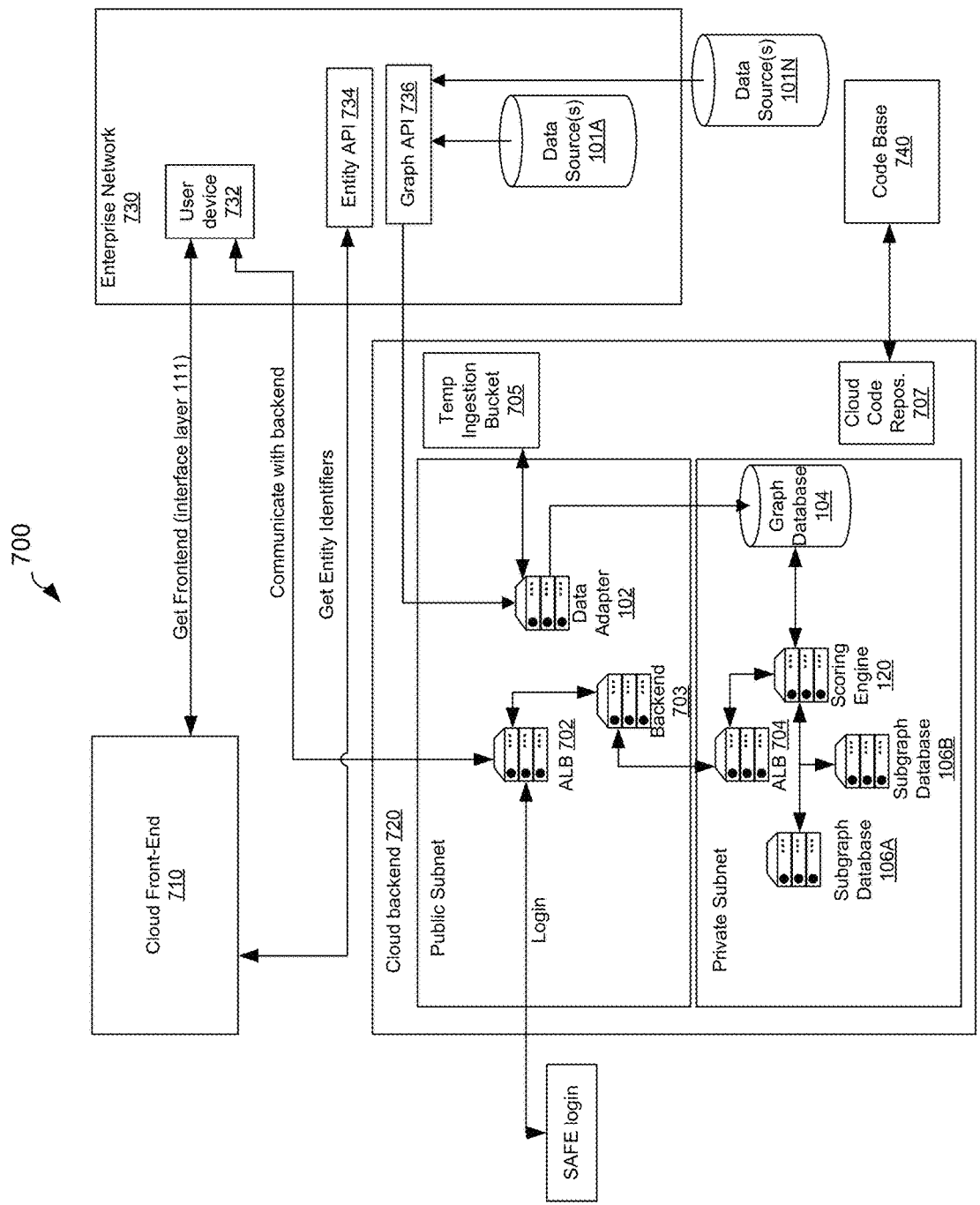
FIG. 7 illustrates a block diagram of a cloud-based implementation of the computer system illustrated in FIG. 1, according to an example.

FIG. 7 illustrates a block diagram of a cloud-based implementation 700 (hereinafter, "cloud system 700") of the computer system illustrated in FIG. 1, according to an example. The cloud system 700 may include cloud front-end 710, a cloud backend 720, an enterprise network 730, a code base 740, and/or other components. The enterprise network 730 may include a computer network that uses a cloud-based service provided by the cloud front-end 710 and cloud backend 720 to execute the various features and operations described with respect to the system 100 illustrated in FIG. 1 and/or the various methods 400-600 described herein. The enterprise network 730 may conduct and provide feature propagation of entities based on graph analysis, as described herein throughout, using the system 100 illustrated in FIG. 1 and/or the cloud-based service as described with respect to FIG. 7. As generally understood, a cloud-based service may include application execution, storage, and/or other computational services provided by a cloud service provider.

In some examples, a user device 732 of the enterprise network 730 may obtain assessments of entities using the enterprise network 730 through the cloud-based service provided by the cloud front-end 710 and the cloud backend 720. Although illustrated as part of the enterprise network 730, the user device 732 may be separate from the enterprise network as well. In some examples, the user device 732 may obtain a frontend from the cloud-front end 710. The frontend may include the interface layer 111 illustrated in FIG. 1. The cloud front-end 710 may obtain entity identifiers for appropriate entities stored by the enterprise network 730 via an entity Application Programming Interface (API) 734. For example, based on entities inputted by the user device 132, the cloud front-end 710 may access entity identifiers corresponding to these entities as stored by the enterprise network 730. Such entities may be stored and monitored by the enterprise network 730.

Once the entities are identified, the user device 732 may communicate with the cloud backend 720. For example, the cloud backend 720 may include an Automated Load Balancer ("ALB") 702 that distributes requests from devices to the backend 703 (which may include a plurality of servers or other compute nodes to execute services) based on loads on the backend 703. In some examples, the ALB 702 may facilitate SAFE login. The backend 703 may communicate with an ALB 704 on a private subnet that is allocated to execute the scoring engine 120. For example, the ALB 704 may send requests to the scoring engine 120, may be load-balanced on the cloud backend 720. The scoring engine 120 may access a graph database 104 to identify appropriate entities as described herein and access one or more data mart 106 (illustrated as data marts 106A, B) to store extracted subgraphs as described herein. The scoring engine 120, executed by the cloud backend 720) may determine a network effect of an entity that is associated with one or more features, determine one or more quantitative feature values (and/or an aggregated quantitative feature value), and/or execute other operations described herein.

In some examples, the data adapter 102 may ingest data from the graph API 736, which may access data from one or more data sources 101, which may be internal or external to the enterprise network 730. The data adapter 102 may use a temporary (temp.) ingestion bucket 705, which may include a storage container provided by the cloud backend 720.

In examples for which the scoring engine 120 and/or data adapters 102 are embodied as instructions executed by a processor, the scoring engine 120 and/or the data adapters 102 may be stored in a code base 740. For example, an operator of the enterprise network 730 may use the code base 740 to store the scoring engine 120 and/or the data adapters 102. The cloud backend 720 may access the code base 740 to store the instructions in cloud code repository (repos.) 707 and/or execute the instructions stored therein. It should be noted that the cloud system 700 has been described by way of example and not limitation. Various details of a cloud-based service and an enterprise network have been omitted for clarity of illustration.

For simplicity and illustrative purposes, the disclosure included descriptions that may refer to examples. In the description, numerous specific details have been set forth in order to provide a thorough understanding of the present disclosure. It will be readily apparent however, that the disclosure may be practiced without limitation to these specific details. In other instances, some methods and structures have not been described in detail so as not to unnecessarily obscure the present disclosure.

Throughout the disclosure, the terms "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A system for determining network-based feature propagation in a network of entities stored in a graph database, the system comprising:
    a processor programmed with one or more instructions to:
        identify an entity that is associated with a feature of interest, the feature of interest being assigned with a quantitative feature value;
        extract a subgraph from the graph database based on the identified entity, the subgraph comprising a plurality of entities including the identified entity and one or more neighbors of the identified entity;
        generate an adjacency list that describes relationships between the plurality of entities in the subgraph;
        generate a plurality of centrality metrics based on the adjacency list, each centrality metric indicating a level of influence an entity in the subgraph has on other entities in the subgraph based on a level of connectedness between the entity and the other entities;
        determine a network effect of the identified entity on the one or more neighbors based on the plurality of centrality metrics and types of relationships between the plurality of entities in the subgraph; and
        generate a respective quantitative feature value for each neighbor based on the determined network effects and the quantitative feature value.

2. The system of claim 1, wherein to determine the network effect of the identified entity, the processor is further programmed to:
    for each neighbor among the one or more neighbors:
        determine a first path that connects the identified entity to the neighbor in the subgraph, the first path comprising one or more entities in the subgraph;
        determine a feature propagation from the identified entity to the neighbor based on a centrality metric of each of the one or more entities in the first path, types of relationships between the one or more entities in the first path, and a first path length of the first path.

3. The system of claim 2, wherein to determine the network effect of the identified entity, the processor is further programmed to:
    for each neighbor among the one or more neighbors:
        determine a second path that connects the identified entity to the neighbor in the subgraph, the second path comprising one or more second entities in the subgraph, the one or more second entities different than the one or more entities in the subgraph;
        determine the feature propagation from the identified entity to the neighbor based further on a second centrality metric of each of the one or more second entities in the second path, types of relationships between the one or more second entities in the first path, and a second path length of the second path.

4. The system of claim 1, wherein to generate a given centrality metric from among the plurality of centrality metrics, the processor is further programmed to:
    determine a degree centrality based on a number of neighbors to which the entity is connected;
    determine a closeness centrality based on a number of shortest paths to other entities in the subgraph; and
    determine a betweenness centrality based on a number of times that the entity appears in a shortest path between other entities, wherein the given centrality metric is based on the degree centrality, the closeness centrality, and the betweenness centrality.

5. The system of claim 4, wherein to generate the given centrality metric, the processor is further programmed to:
    apply a degree weight to the degree centrality to generate a weighted degree centrality;
    apply a closeness weight to the closeness centrality to generate a weighted closeness centrality; and
    apply a betweenness weight to the betweenness centrality to generate a weighted betweenness centrality.

6. The system of claim 5, wherein to determine the given centrality metric, the processor is further programmed to:
    aggregate the weighted degree centrality, the weighted closeness centrality, and the weighted betweenness centrality to generate the given centrality metric.

7. The system of claim 1, wherein the relationship of the entity to at least one of the neighbor entities is accessed from predefined relationship data.

8. The system of claim 7, wherein the relationship comprises a predefined weight setting for each type of relationship comprising a first weight for a first type of relationship and a second weight for a second type of relationship such that one type of relationship is weighted higher than another type of relationship to determine the network effect on a neighbor entity.

9. The system of claim 1, wherein the processor is further programmed to:
   identify a plurality of types of features; and
   generate a corresponding quantitative feature value for each type of feature among the plurality of types of features.

10. The system of claim 1, wherein the processor is further programmed to:
   access a request to assess a risk associated with an entity identified by an entity identifier; and
   provide a corresponding quantitative feature value for the entity identified by the entity identifier.

11. A method of determining network-based feature propagation in a network of entities stored in a graph database, the method implemented on a computer system having a processor programmed to perform the method, the method comprising:
   identifying, by a computer system, an entity that is associated with a feature of interest, the feature of interest being assigned with a quantitative feature value;
   extracting, by the computer system, a subgraph from the graph database based on the identified entity, the subgraph comprising a plurality of entities including the identified entity and one or more neighbors of the identified entity;
   generating, by the computer system, an adjacency list that describes relationships between the plurality of entities in the subgraph;
   generating, by the computer system, a plurality of centrality metrics based on the adjacency list, each centrality metric indicating a level of influence an entity in the subgraph has on other entities in the subgraph based on a level of connectedness between the entity and the other entities;
   determining, by the computer system, a network effect of the identified entity on the one or more neighbors based on the plurality of centrality metrics and types of relationships between the plurality of entities in the subgraph; and
   generating, by the computer system, a respective quantitative feature value for each neighbor based on the determined network effects and the quantitative feature value.

12. The method of claim 11, wherein determining the network effect of the identified entity comprises:
   for each neighbor among the one or more neighbors:
      determining a first path that connects the identified entity to the neighbor in the subgraph, the first path comprising one or more entities in the subgraph; and
      determining a feature propagation from the identified entity to the neighbor based on a centrality metric of each of the one or more entities in the first path, types of relationships between the one or more entities in the first path, and a first path length of the first path.

13. The method of claim 12, wherein determining the network effect of the identified entity comprises:
   for each neighbor among the one or more neighbors:
      determining a second path that connects the identified entity to the neighbor in the subgraph, the second path comprising one or more second entities in the subgraph, the one or more second entities different than the one or more entities in the subgraph; and
      determining the feature propagation from the identified entity to the neighbor based further on a second centrality metric of each of the one or more second entities in the second path, types of relationships between the one or more second entities in the first path, and a second path length of the second path.

14. The method of claim 11, wherein generating a given centrality metric from among the plurality of centrality metrics comprises:
   determining a degree centrality based on a number of neighbors to which the entity is connected;
   determining a closeness centrality based on a number of shortest paths to other entities in the subgraph; and
   determining a betweenness centrality based on a number of times that the entity appears in a shortest path between other entities, wherein the given centrality metric is based on the degree centrality, the closeness centrality, and the betweenness centrality.

15. The method of claim 14, wherein generating the given centrality metric comprises:
   applying a degree weight to the degree centrality to generate a weighted degree centrality;
   applying a closeness weight to the closeness centrality to generate a weighted closeness centrality; and
   applying a betweenness weight to the betweenness centrality to generate a weighted betweenness centrality.

16. The method of claim 15, wherein determining the given centrality metric comprises:
   aggregating the weighted degree centrality, the weighted closeness centrality, and the weighted betweenness centrality to generate the given centrality metric.

17. The method of claim 11, further comprising:
   identifying a plurality of types of features; and
   generating a corresponding quantitative feature value for each type of feature among the plurality of types of features.

18. A method, comprising:
   receiving, by a processor, a request to assess an entity, the request comprising an identification of the entity;
   identifying, by the processor, a first entity of interest that is associated with a feature of interest;
   identifying, by the processor, one or more paths from the entity to the first entity of interest, the one or more paths, each path comprising one or more entities in the path;
   determining, by the processor, a plurality of path lengths, each path length corresponding to a respective path of the one or more paths;
   determining, by the processor, a plurality of centrality metrics for each entity in each path, each centrality metric indicating a level of influence an entity in a subgraph has on other entities in the subgraph based on a level of connectedness between the entity and the other entities; and
   determining, by the processor, a network effect of the first entity of interest on the entity based on the plurality of centrality metrics and the plurality of path lengths.

19. The method of claim 18, wherein the feature of interest is associated with a quantitative feature value, the method further comprising:
   determining a scaled quantitative feature value for the entity based on the network effect and the quantitative feature value.

20. The method of claim 19, the method further comprising:
   identifying a second entity of interest that is associated with the feature of interest;
   determining a second network effect of the second entity of interest on the entity, wherein the scaled quantitative feature value is determined based further on the second network effect.

* * * * *